United States Patent
Nicholson et al.

(10) Patent No.: US 12,087,254 B2
(45) Date of Patent: Sep. 10, 2024

(54) COMPUTING DEVICES, COMPUTER-READABLE MEDIUM, AND METHODS FOR REDUCING POWER CONSUMPTION DURING VIDEO RENDERING

(71) Applicant: Lenovo (Singapore) Pte. Ltd., New Tech Park (SG)

(72) Inventors: John W. Nicholson, Cary, NC (US); Daryl C. Cromer, Raleigh, NC (US); Howard Locker, Cary, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/939,620

(22) Filed: Sep. 7, 2022

(65) Prior Publication Data

US 2024/0078983 A1  Mar. 7, 2024

(51) Int. Cl.
*G09G 5/36* (2006.01)
*G06F 1/3231* (2019.01)

(52) U.S. Cl.
CPC .......... *G09G 5/363* (2013.01); *G06F 1/3231* (2013.01); *G09G 2330/021* (2013.01); *G09G 2340/0435* (2013.01)

(58) Field of Classification Search
CPC .............. G09G 5/363; G06F 1/3231
USPC .......................... 345/522, 207, 213
See application file for complete search history.

(56) References Cited

U.S. PATENT DOCUMENTS

| | | | |
|---|---|---|---|
| 9,652,816 B1* | 5/2017 | Holland | G09G 5/39 |
| 2013/0207951 A1* | 8/2013 | Didyk | G06T 5/50 345/207 |
| 2016/0210908 A1* | 7/2016 | Seki | G09G 5/06 |
| 2017/0075432 A1* | 3/2017 | Verbeure | G09G 5/08 |
| 2017/0178408 A1* | 6/2017 | Bavor, Jr. | G06T 19/006 |
| 2020/0304551 A1* | 9/2020 | Wang | H04L 65/60 |
| 2021/0132769 A1* | 5/2021 | Parikh | G06F 1/1677 |
| 2022/0093057 A1* | 3/2022 | Glen | G09G 5/006 |
| 2023/0178050 A1* | 6/2023 | Lee | G06F 3/041 345/213 |

* cited by examiner

*Primary Examiner* — Prabodh M Dharia
(74) *Attorney, Agent, or Firm* — Kunzler Bean & Adamson

(57) ABSTRACT

Methods, computing devices, and computer-readable medium storing machine-readable instructions are disclosed for rendering video images for reducing energy consumption. An exemplary method performed in a computing system includes rendering video images at a first refresh rate, sending the rendered video images to a display device, determining if a reduced refresh rate event is occurring, and rendering video images at a second refresh rate responsive to determining the reduced refresh rate event is occurring. The second refresh rate is slower than the first refresh rate.

18 Claims, 4 Drawing Sheets

COMPUTING DEVICES, COMPUTER-READABLE MEDIUM, AND METHODS FOR REDUCING POWER CONSUMPTION DURING VIDEO RENDERING

FIELD

The subject matter disclosed herein relates generally to image rendering and more particularly relates to devices, methods, and non-transitory computer-readable medium for controlling image rendering for reducing power consumption.

BACKGROUND

Newer personal computers (PCs) are achieving image refresh rates of 240 Hz. However, higher refresh rates use more power. This is because the PC must work faster to support the higher refresh rate, thus drawing more power.

BRIEF SUMMARY

Computing devices, computer-readable medium, methods for rendering video images for reducing energy consumption are disclosed. An exemplary method performed in a computing system includes rendering video images at a first refresh rate, sending the rendered video images to a display device, determining if a reduced refresh rate event is occurring, and rendering video images at a second refresh rate responsive to determining the reduced refresh rate event is occurring. The second refresh rate is slower than the first refresh rate.

In another embodiment, an apparatus includes a display device, a processor in data communication with the display device, a storage device configured to store machine-readable instructions that, when executed by the processor, cause the processor to render video images at a first refresh rate; send the rendered video images to the display device, determine if a reduced refresh rate event is occurring, and render video images at a second refresh rate responsive to determining the reduced refresh rate event is occurring. The second refresh rate is slower than the first refresh rate.

In still another embodiment, a non-transitory computer-readable medium storing machine-readable instructions that, when executed by a processor of a computing system, cause the processor to render video images at a first refresh rate, send the rendered video images to the display device, determine if a reduced refresh rate event is occurring, and render video images at a second refresh rate responsive to determining the reduced refresh rate event is occurring. The second refresh rate is slower than the first refresh rate.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
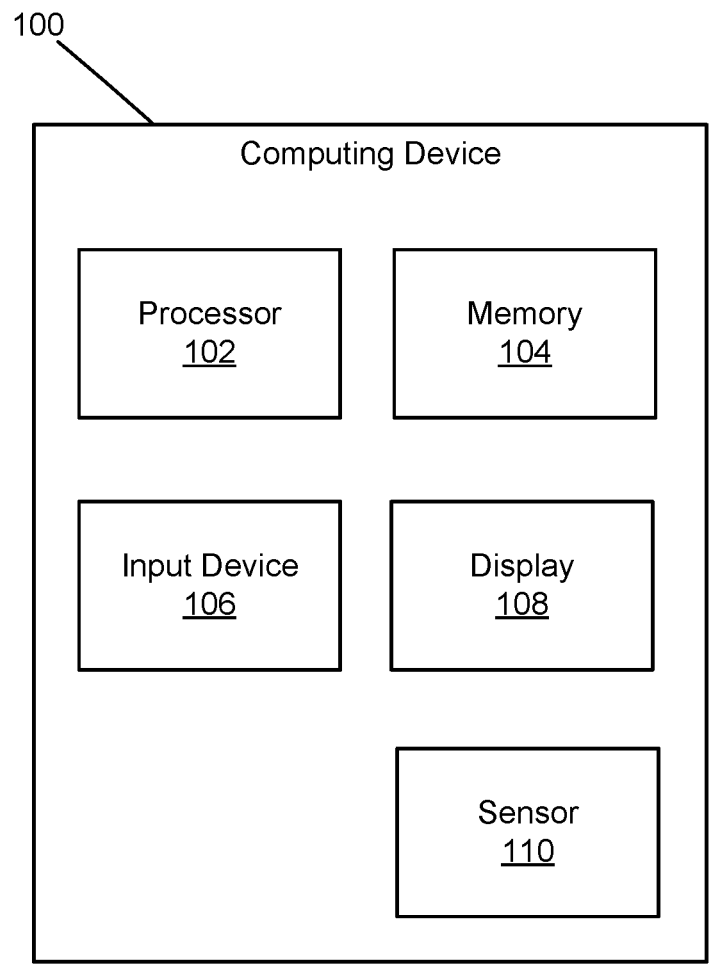
FIG. 1 is a schematic block diagram illustrating one embodiment of a computing system for rendering images for display.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a computing device 100 for power reduction based on how images are presented to a user. In one embodiment, the computing device 100 may include computing devices, such as desktop computers, laptop computers, personal digital assistants ("PDAs"), tablet computers, smart phones, televisions, set-top boxes, game consoles, security systems (including security cameras), vehicle on-board computers, or the like. In some embodiments, the computing device 100 includes wearable devices, such as smart watches, fitness bands, optical head-mounted displays, or any device that generates signals for an output device (e.g., displays, speakers, haptic devices).

According to various embodiments, the present invention can be implemented on any electronic device, such as a handheld computer, personal digital assistant (PDA), personal computer, kiosk, cellular telephone, and the like. For example, in various embodiments, the invention can be implemented as a feature of a software application or operating system running on such a device. Accordingly, the following description is intended to illustrate various embodiments of the invention by way of example, rather than to limit the scope of the claimed invention.

In one embodiment, the computing device 100 includes a processor 102, a memory 104, an input device(s) 106, a display 108, and a sensor(s) 110. The processor 102 may include any known controller capable of executing computer-readable instructions and/or capable of performing logical operations. For example, the processor 102 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 102 executes instructions stored in the memory 104 to perform the methods and routines described herein. The processor 102 is communicatively coupled to the memory 104, the input device 106, the display 108, and the sensor(s) 110.

The memory 104, in one embodiment, is a computer readable storage medium. In some embodiments, the memory 104 includes volatile computer storage media. For example, the memory 104 may include a RAM, including dynamic RAM ("DRAM"), synchronous dynamic RAM ("SDRAM"), and/or static RAM ("SRAM"). In some embodiments, the memory 104 includes non-volatile computer storage media. For example, the memory 104 may include a hard disk drive, a flash memory, or any other suitable non-volatile computer storage device. In some embodiments, the memory 104 includes both volatile and non-volatile computer storage media (i.e., non-transitory machine-readable instructions). In some embodiments, the memory 104 also stores program code and related data, such as an operating system or other controller algorithms operating on the computing device 100.

The input device 106, in one embodiment, may include any known computer input device including a touch pad, a button, a keyboard, a stylus, a microphone, or the like. In some embodiments, the input device 106 may be integrated with the display 108, for example, as a touchscreen or similar touch-sensitive display. In some embodiments, the input device 106 includes a touchscreen such that text may be input using a virtual keyboard displayed on the touchscreen and/or by handwriting on the touchscreen. In some embodiments, the input device 106 includes two or more different devices, such as a keyboard and a touch pad.

The display 108, in one embodiment, may include any known electronically controllable display or display device. In some embodiments, the display 108 includes an electronic display capable of outputting visual data to a user. For example, the display 108 may include, but is not limited to, a liquid crystal display (LCD), a light-emitting diode (LED) display, an organic light-emitting diode (OLED) display, a projector, or similar display device capable of outputting images, video, text, or the like to a user. As another, non-limiting, example, the display 108 may include a wearable display such as a smart watch, smart glasses, virtual reality (VR) glasses, a heads-up display, or the like. Further, the display 108 may be a component of a smart phone, a personal digital assistant, a television, a set-top box, a game console, a table computer, a notebook (laptop) computer, a personal computer, a vehicle dashboard, or the like.

The display 108 may be another type of output device that may be commanded by the processor 102 to operate at higher power level when outputting data to the output device at a first refresh rate and a lower power level when outputting data to the output device at a second refresh rate.

The display 108 may be designed to output visual, audible, and/or haptic signals. In certain embodiments, the display 108 or other output device includes one or more speakers for producing sound. For example, the speakers may produce an audible alert or notification (e.g., a beep or chime). In some embodiments, the other output device includes one or more haptic devices for producing vibrations, motion, or other haptic feedback.

In some embodiments, all or portions of the display 108 may be integrated with the input device 106. For example, the input device 106 and display 108 may form a touchscreen or similar touch-sensitive display. In other embodiments, the display 108 may be located near the input device 106.

In various embodiments, the sensor 110 may include a camera, a motion sensor, a presence detector, or the like. The images or data produced by the sensor 110 are sent to the processor 102 for analysis.

Figure 2:
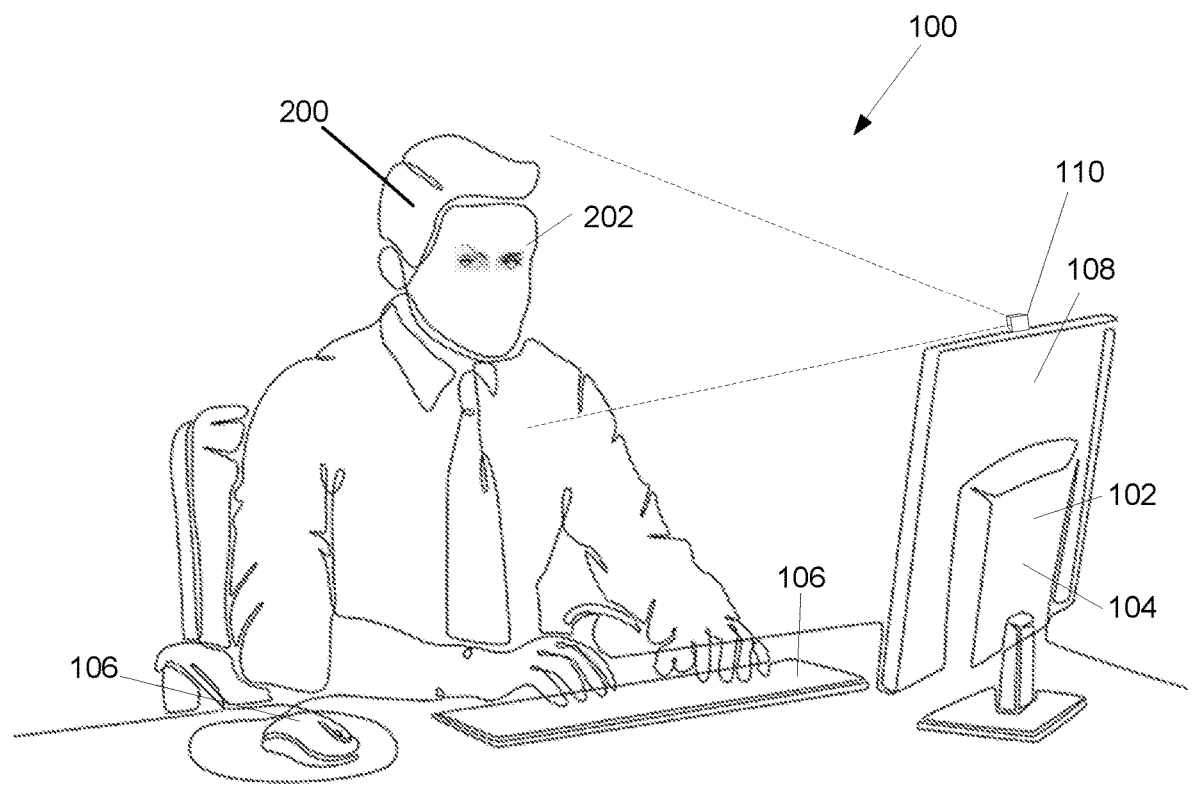
FIG. 2 is a perspective view of a user operating the computing system of FIG. 1.

In various embodiments, referring to FIG. 2, the non-transitory machine-readable instructions, when executed by the processor 102, cause the processor 102 to determine if a user 200 is present and/or attentive based on information received from the sensor 110. The processor 102 may perform human presence detection and/or eye tracking by analyzing images or data produced by the sensor 110. In one embodiment, once the processor 102 detects eyes 202 of the user 200 have looked away from or is not targeting the display 108 for a threshold period of time, the processor 102 reduces the refresh rate of display images to the second predefined refresh rate value from an original first refresh rate value. In one embodiment, once the processor 102 detects the user 200 is not present in front of the sensor 110 or the display 108, the processor 102 reduces the refresh rate of display images to a second predefined refresh rate value from an original first refresh rate value. The processor 102 increases the refresh rate to a third predefined refresh rate value or the first refresh rate value when the processor 102 determines that the eyes 202 of the user 200 are looking at the display 108, the user 200 is present in front of the display 108, or the like. The second predefined refresh rate value may be the lowest possible refresh rate value able to maintain a human perceptible image on the display 108 or may be a refresh rate value lower than the original first refresh rate value or the third predefined refresh rate value. The original first refresh rate value may be the highest possible value that the processor 102 and the display 108 can execute.

In various embodiments, the non-transitory machine-readable instructions, when executed by the processor 102, may cause the processor 102 to step down or increase the refresh rate of generated images multiple levels. The step down or increase may be performed sequentially by refresh rate level or may skip one or more refresh rate levels in a transition. For example, if the processor 102 determines that a user has been sensed as not present to present with eyes directed at the display 108, the processor 102 changes the refresh rate from the lowest value to a highest value, skipping any refresh rate levels in between the two.

In various embodiments, the processor 102 provides user presence information and/or user attention information to an actively running application(s). The actively running application(s) may control their own refresh processing (i.e., image generation) for assisting the computing device 100 in saving power.

In various embodiments, the processor 102 is capable identifying if the refresh rate should increase or decrease and then informing actively running application(s), so that the actively running application(s) may control their own refresh processing.

In various embodiments, the instructions cause the processor 102 to alter the refresh rate based on changes or lack of changes to outputted data (e.g., pixel image data). The refresh rate only needs to be as fast as the changes in pixels on the screen. High quality video streaming or 3D gaming requires a high refresh rate as the pixels are constantly changing. The application may base the refresh rate of images it produces based on sensor information (as described above) or based on expected action or inaction of images-to-be-produced by the application. For example, if the application is a game, the application knows when the image activity may be entering a low activity state (i.e., low pixel change rate or image doesn't change very much). In such a situation, the application reduces the refresh rate one or more levels and increases the refresh rate if the opposite occurs.

Editing a work document in full screen mode does not require a high refresh rate as the screen is mostly static. The processor 102 can detect this by having a N frame and N−1 frame buffer containing the screen pixels. If the N and N−1 are equal, the refresh rate is reduced by 50%. If N and N−1 are different than a threshold amount, the refresh rate is increased by 50%. In one non-limiting example, the display supports 240 Hz refresh rate. To ensure reasonable performance a minimum refresh rate of 60 Hz is set. If no pixels are changing or a minimal number of pixels are changing between image frames, the refresh rate would go from 240 hz to 120 hz and then to 60 hz if the pixel change rate or amount stays steady. The refresh rate remains at 60 Hz until the processor 102 detects significant pixel change, thus moving the refresh rate to 120 hz. If more significant or continual changes of the pixels occur, the refresh rate returns to the fastest refresh rate of 240 hz.

In various embodiments, the user can also decide that they want the computing device 100 to change refresh rate more or less quickly in response to pixel change information, user presence information, user eye tracking information, or the like. User selection of changing refresh rates is performed by activating the input device 106.

Figure 3:
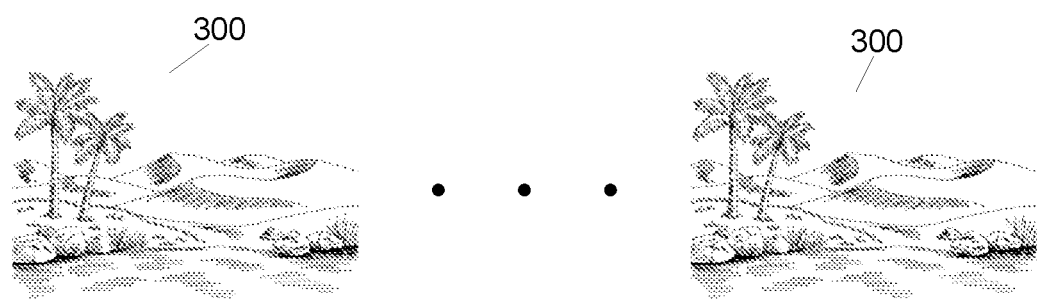
FIG. 3 are frames of a video generated by the computing system of FIG. 1.
Figure 4:
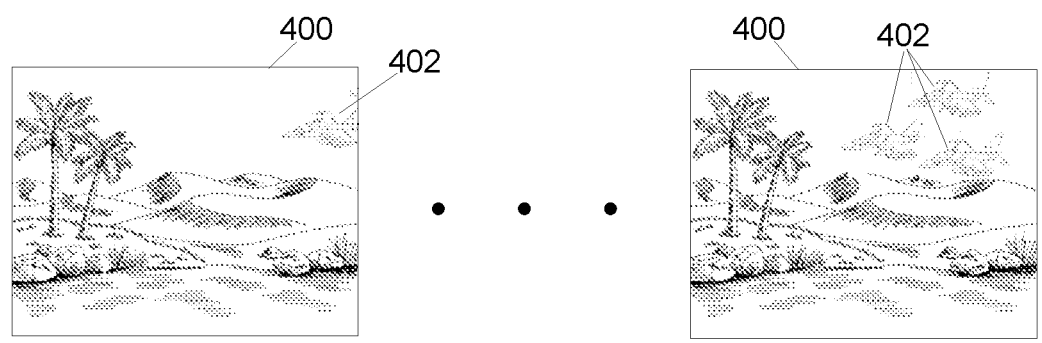
FIG. 4 are frames of a dynamic video generated by the computing system of FIG. 1.

In various embodiments, referring to FIGS. 3 and 4, the processor 102 analyzes pixel change across image frames 300 and 400 to determine whether the image refresh rate should be increased, decreased, or remain the same. In FIG. 3, the images in the image frames 300 stay pretty much the same. When the images in the image frames 300 exhibit little or no pixels changing values, the processor 102 determines to lower the refresh rate for succeeding frames. In FIG. 4, planes 402 move through the image frames 400, thereby causing the processor 102 to determine that the image refresh rate should remain at the high refresh rate or transitions from a low refresh rate to a higher or the highest refresh rate.

Figure 5:
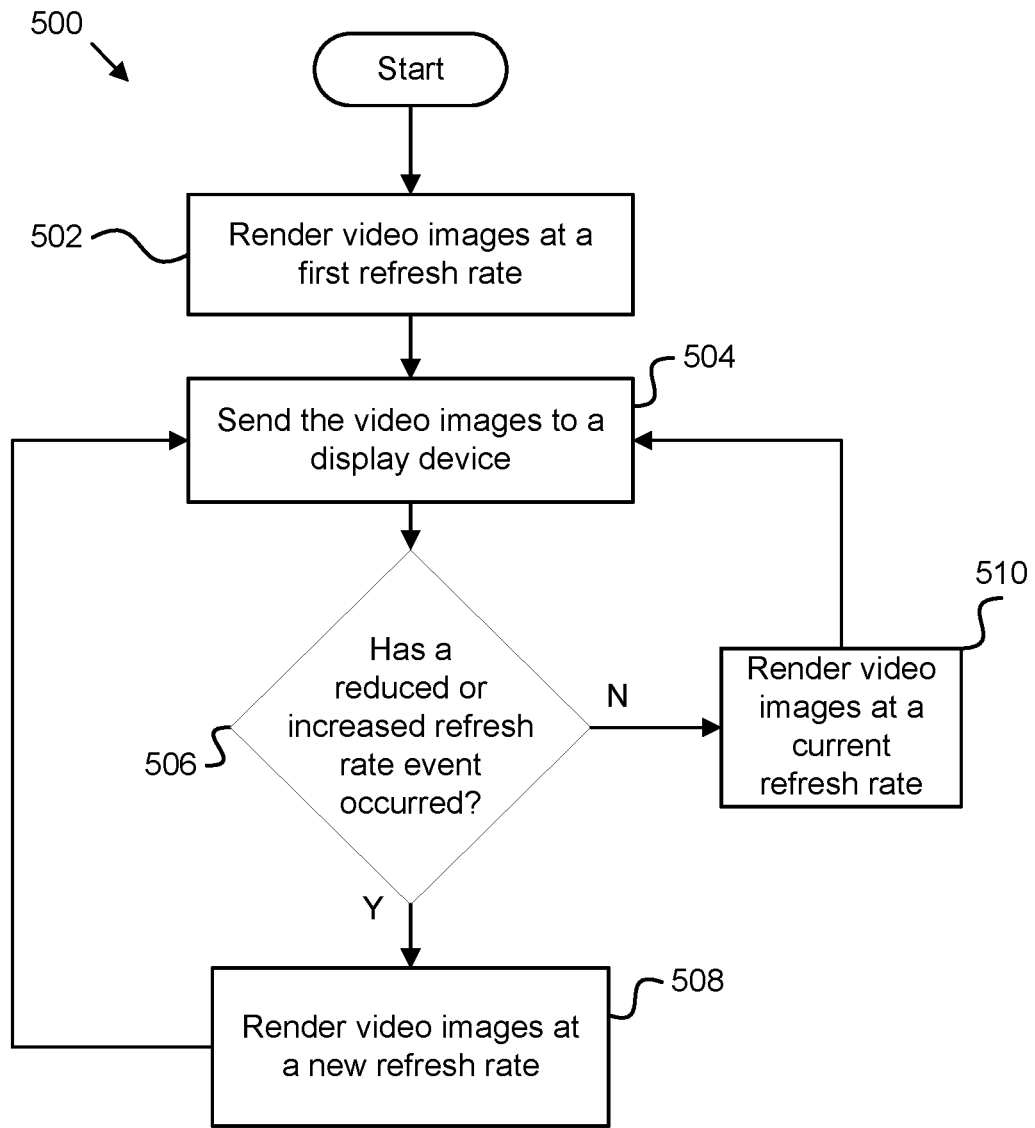
FIG. 5 is a flow diagram of a method for rendering images from a computing devices.

Referring to FIG. 5, a flow diagram of a method 500 is described. At a block 502, video images (i.e., image frames) are rendered at a first refresh rate. At a block 504, the rendered video images are sent to a display device. At a block 506, the method 500 determines if a reduced refresh rate event or an increased refresh rate event has occurred. If the reduced refresh rate event or the increased refresh rate event has not occurred, then at a block 510 video images are rendered at a currently set refresh rate and then to the block 504. If the reduced refresh rate event has occurred, then, at a block 508, video images are rendered at a reduced new refresh rate, then sent to the display device (the block 504). If the increased refresh rate event has occurred, then, at a block 508, video images are rendered at an increased new refresh rate, then send to the display device (block 504).

Embodiments

A. An exemplary method performed in a computing system. The method comprising: rendering video images at a first refresh rate; sending the rendered video images to a display device; determining if a reduced refresh rate event is occurring; and rendering video images at a second refresh rate responsive to determining the reduced refresh rate event is occurring. The second refresh rate is slower than the first refresh rate.

B. The method of A, further comprising: determining that the reduced refresh rate event has been occurring for longer than a threshold amount of time; and rendering video images at a third refresh rate responsive to determining that the reduced refresh rate event has been occurring for longer than the threshold amount of time. The third refresh rate is slower than the second refresh rate.

C. The method of B, further comprising: determining that the reduced refresh rate event is no longer occurring; and rendering video images at the second refresh rate if the video images were previously rendered at the third refresh rate or at the first refresh rate if the video images were previously rendered at the second refresh rate responsive to determining that the reduced refresh rate event is no longer occurring.

D. The method of any of A-C, wherein determining the reduced refresh rate event is occurring comprises: receiving information from a sensor; identifying an inactive user or a non-existent user of the computing system based on the information from the sensor; and determining that the reduced refresh rate event is occurring responsive to identifying the inactive user or the non-existent user.

E. The method of D, wherein: receiving the information from the sensor comprises receiving image information; and identifying an inactive user or a non-existent user comprises identifying lack of human presence information based on the image information.

F. The method of any of A-E, wherein determining the reduced refresh rate event is occurring comprises: determining a rate of change of pixel values between consecutive frames of the rendered video images; and determining the existence of the reduced refresh rate event responsive to the rate of change being less than a threshold value.

G. The method of any of A-F, wherein determining the existence of the first event comprises: determining a number of pixels that have changed between consecutive frames of the rendered video images; and determining the existence of the reduced refresh rate event responsive to the number of pixels that have changed being less than a threshold amount.

H. A computing device comprising: a display device; a processor in data communication with the display device; a storage device configured to store machine-readable instructions that, when executed by the processor, cause the processor to: render video images at a first refresh rate; send the rendered video images to the display device; determine if a reduced refresh rate event is occurring; and render video images at a second refresh rate responsive to determining the reduced refresh rate event is occurring. The second refresh rate is slower than the first refresh rate.

I. The computing device of H, wherein the instructions further cause the processor to: determine that the reduced refresh rate event has been occurring for longer than a threshold amount of time; and render video images at a third refresh rate responsive to determining that the reduced refresh rate event has been occurring for longer than the threshold amount of time. The third refresh rate is slower than the second refresh rate.

J. The computing device of I, wherein the instructions further cause the processor to: determine that the reduced refresh rate event is no longer occurring; and render video images at the second refresh rate if the video images were previously rendered at the third refresh rate or at the first refresh rate if the video images were previously rendered at the second refresh rate responsive to determining that the reduced refresh rate event is no longer occurring.

K. The computing device of any of H-J, further comprising a sensor configured to generate information, wherein determining the reduced refresh rate event is occurring comprises: identifying an inactive user or a non-existent user of the computing system based on the information generated by the sensor; and determining that the reduced refresh rate event is occurring responsive to identifying the inactive user or the non-existent user.

L. The computing device of K, wherein: the information generated by the sensor comprises image information; and identifying an inactive user or a non-existent user comprises identifying lack of human presence information based on the image information.

M. The computing device of any of H-L, wherein determining the reduced refresh rate event is occurring comprises: determining a rate of change of pixel values between consecutive frames of the rendered video images; and determining the existence of the reduced refresh rate event responsive to the rate of change being less than a threshold value.

N. The computing device of any of H-M, wherein determining the existence of the first event comprises: determining a number of pixels that have changed between consecutive frames of the rendered video images; and determining the existence of the reduced refresh rate event responsive to the number of pixels that have changed being less than a threshold amount.

O. A non-transitory computer-readable medium storing machine-readable instructions that, when executed by a processor of a computing system, cause the processor to: render video images at a first refresh rate; send the rendered video images to the display device; determine if a reduced refresh rate event is occurring; and render video images at a second refresh rate responsive to determining the reduced refresh rate event is occurring. The second refresh rate is slower than the first refresh rate.

P. The computer-readable medium of O, wherein the instructions further cause the processor to: determine that the reduced refresh rate event has been occurring for longer than a threshold amount of time; and render video images at a third refresh rate responsive to determining that the reduced refresh rate event has been occurring for longer than the threshold amount of time. The third refresh rate is slower than the second refresh rate.

Q. The computer-readable medium of P, wherein the instructions further cause the processor to: determine that the reduced refresh rate event is no longer occurring; and render video images at the second refresh rate if the video images were previously rendered at the third refresh rate or at the first refresh rate if the video images were previously rendered at the second refresh rate responsive to determining that the reduced refresh rate event is no longer occurring.

R. The computer-readable medium of any of O-Q, wherein: the instructions further cause the processor to receive information from a sensor; determining the reduced refresh rate event is occurring comprises: identifying an inactive user or a non-existent user of the computing system based on the information from the sensor; and determining that the reduced refresh rate event is occurring responsive to identifying the inactive user or the non-existent user.

S. The computer-readable medium of R, wherein: the information from the sensor comprises image information; and identifying an inactive user or a non-existent user comprises identifying lack of human presence information based on the image information.

T. The computer-readable medium of any of O-S, wherein determining the reduced refresh rate event is occurring comprises: determining a rate of change of pixel values between consecutive frames of the rendered video images or a number of pixels that have changed between consecutive frames of the rendered video images; and determining the existence of the reduced refresh rate event responsive to the rate of change being less than a threshold value or the number of pixels that have changed being less than a threshold amount.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method performed at a computing system, the method comprising:
   rendering video images at a first refresh rate;
   sending the rendered video images to a display device;
   determining if a reduced refresh rate event is occurring, wherein determining if a reduced refresh rate event is occurring comprises:
   receiving image information from a sensor; and
   determining the reduced refresh rate event is occurring based on the image information including an inactive user or a non-existent user of the computing system; and
   skipping one or more refresh rate levels to a second refresh rate responsive to determining the reduced refresh rate event is occurring, wherein the second refresh rate is slower than the first refresh rate.

2. The method of claim 1, further comprising:
   determining that the reduced refresh rate event has been occurring for longer than a threshold amount of time; and
   rendering video images at a third refresh rate responsive to determining that the reduced refresh rate event has been occurring for longer than the threshold amount of time;

wherein the third refresh rate is slower than the second refresh rate.

3. The method of claim 1, further comprising:
determining that the reduced refresh rate event is no longer occurring; and
rendering additional video images at an increased refresh rate from a refresh rate of previously rendered video images responsive to determining that the reduced refresh rate event is no longer occurring.

4. The method of claim 1, wherein determining the reduced refresh rate event is occurring comprises:
determining a rate of change of pixel values between consecutive frames of the rendered video images or a number of pixels that have changed between consecutive frames of the rendered video images; and
determining the reduced refresh rate event is occurring responsive to the rate of change being less than a threshold value or to the number of pixels that have changed being less than a threshold amount.

5. The method of claim 1, wherein rendering video images at a second refresh rate comprises:
informing an application program being executed on the computing system; and
rendering video images by the application program at the second refresh rate.

6. The method of claim 1, wherein analyzing comprises identifying user presence or eye tracking information of a user.

7. A computing device comprising:
a display device;
a sensor configured to image information;
a processor in data communication with the display device;
a storage device configured to store machine-readable instructions that, when executed by the processor, cause the processor to:
render video images at a first refresh rate;
send the rendered video images to the display device;
determine if a reduced refresh rate event is occurring based on the image information including an inactive user or a non-existent user of the computing device; and
skip one or more refresh rate levels to render video images at a second refresh rate responsive to determining the reduced refresh rate event is occurring, wherein the second refresh rate is slower than the first refresh rate.

8. The computing device of claim 7, wherein the instructions further cause the processor to:
determine that the reduced refresh rate event has been occurring for longer than a threshold amount of time; and
render video images at a third refresh rate responsive to determining that the reduced refresh rate event has been occurring for longer than the threshold amount of time, wherein the third refresh rate is slower than the second refresh rate.

9. The computing device of claim 7, wherein the instructions further cause the processor to:
determine that the reduced refresh rate event is no longer occurring; and
render video images at an increased refresh rate from a refresh rate of previously rendered video images responsive to determining that the reduced refresh rate event is no longer occurring.

10. The computing device of claim 8, wherein determining the reduced refresh rate event is occurring comprises:

determining a rate of change of pixel values between consecutive frames of the rendered video images or a number of pixels that have changed between consecutive frames of the rendered video images; and
determining the reduced refresh rate event is occurring responsive to the rate of change being less than a threshold value or to the number of pixels that have changed being less than a threshold amount.

11. The computing device of claim 7, wherein rendering video images at a second refresh rate comprises:
informing an application program being executed on the computing system; and
rendering video images by the application program at the second refresh rate.

12. The computing device of claim 7, wherein determining if the reduced refresh rate event is occurring is further based on the image information including_user presence or eye tracking information of a user.

13. A non-transitory computer-readable medium storing machine-readable instructions that, when executed by a processor of a computing system, cause the processor to:
render video images at a first refresh rate;
send the rendered video images to a display device;
receiving image information from a sensor:
determine if a reduced refresh rate event is occurring based on the image information including an inactive user or a non-existent user of the computing system; and
skip one or more refresh rate levels to render video images at a second refresh rate responsive to determining the reduced refresh rate event is occurring, wherein the second refresh rate is slower than the first refresh rate.

14. The computer-readable medium of claim 13, wherein the instructions further cause the processor to:
determine that the reduced refresh rate event has been occurring for longer than a threshold amount of time; and
render video images at a third refresh rate responsive to determining that the reduced refresh rate event has been occurring for longer than the threshold amount of time, wherein the third refresh rate is slower than the second refresh rate.

15. The computer-readable medium of claim 13, wherein the instructions further cause the processor to:
determine that the reduced refresh rate event is no longer occurring; and
render video images at an increased refresh rate from a refresh rate of previously rendered video images responsive to determining that the reduced refresh rate event is no longer occurring.

16. The computer-readable medium of claim 13, wherein:
the instructions further cause the processor to receive information from a sensor;
determining the reduced refresh rate event is occurring comprises:
identifying an inactive user or a non-existent user of the computing system based on the information from the sensor; and
determining that the reduced refresh rate event is occurring responsive to identifying the inactive user or the non-existent user.

17. The computer-readable medium of claim 13, wherein determining the reduced refresh rate event is occurring comprises:
determining a rate of change of pixel values between consecutive frames of the rendered video images or a number of pixels that have changed between consecutive frames of the rendered video images; and determining the reduced refresh rate event is occurring responsive to the rate of change being less than a threshold value or the number of pixels that have changed being less than a threshold amount.

18. The computer-readable medium of claim 13, wherein determinining determining if the reduced refresh rate event is occurring is further based on the image information including user presence or eye tracking information of a user.

* * * * *